(12) United States Patent
Sitti et al.

(10) Patent No.: US 10,689,549 B2
(45) Date of Patent: Jun. 23, 2020

(54) MICROFIBERS WITH MUSHROOM-SHAPED TIPS FOR OPTIMAL ADHESION

(71) Applicant: nanoGriptech, Inc., Pittsburgh, PA (US)

(72) Inventors: Metin Sitti, Pittsburgh, PA (US); Burak Aksak, Lubbock, TX (US)

(73) Assignee: NanoGriptech, Inc., Pittsburgh, PA (US)

( * ) Notice: Subject to any disclaimer, the term of this patent is extended or adjusted under 35 U.S.C. 154(b) by 828 days.

(21) Appl. No.: 14/766,561

(22) PCT Filed: Feb. 10, 2014

(86) PCT No.: PCT/US2014/015511
§ 371 (c)(1),
(2) Date: Aug. 7, 2015

(87) PCT Pub. No.: WO2014/124352
PCT Pub. Date: Aug. 14, 2014

(65) Prior Publication Data
US 2015/0368519 A1 Dec. 24, 2015

Related U.S. Application Data

(60) Provisional application No. 61/850,110, filed on Feb. 8, 2013.

(51) Int. Cl.
*C09J 9/00* (2006.01)
*C09J 7/00* (2018.01)
*D01D 5/20* (2006.01)

(52) U.S. Cl.
CPC . *C09J 9/00* (2013.01); *C09J 7/00* (2013.01); *D01D 5/20* (2013.01);
(Continued)

(58) Field of Classification Search
CPC .. C09J 7/00–50; C09J 9/00; C09J 123/00–36; C09J 175/00–16;
(Continued)

(56) References Cited

U.S. PATENT DOCUMENTS

| | | | | |
|---|---|---|---|---|
| 5,983,467 A | * | 11/1999 | Duffy | A44B 18/0046 24/442 |
| 8,206,631 B1 | * | 6/2012 | Sitti | B29C 39/10 264/255 |
| 2010/0021647 A1 | | 1/2010 | Sitti et al. | |
| 2012/0319320 A1 | | 12/2012 | Sitti et al. | |

FOREIGN PATENT DOCUMENTS

WO 2012026973 A2 3/2012

OTHER PUBLICATIONS

Del Campo, Aranzazu, et al. "Contact Shape Controls Adhesion of Bioinspired Fibrillar Surfaces." Langmuir, Aug. 28, 2007. (Year: 2007).*

(Continued)

*Primary Examiner* — Laura C Powers
*Assistant Examiner* — Larissa Rowe Emrich
(74) *Attorney, Agent, or Firm* — David G. Oberdick; Michael G. Monyok

(57) ABSTRACT

This invention identifies important geometric parameters of an adhesive microfiber with mushroom-shaped tip for improving and optimizing adhesive ability. The magnitude of pull-off stress is dependent on a wedge angle $\gamma$ and the ratio of the tip radius to the stalk radius $\beta$ of the mushroom-shaped fiber. Pull-off stress is also found to depend on a dimensionless parameter x, the ratio of the fiber radius to a length-scale related to the dominance of adhesive stress. Finally, the shape of edge tip, where the surface and sides of the mushroom-shaped tip join, is a factor that impacts strength of adhesion. Optimizing ranges for these parameters are identified.

6 Claims, 7 Drawing Sheets

(52) U.S. Cl.
CPC ..... *C09J 2201/626* (2013.01); *D10B 2331/10* (2013.01); *Y10T 428/2976* (2015.01)

(58) Field of Classification Search
CPC ... C09J 2201/626; C09J 2203/30; D01D 5/20; D01D 2331/10; Y10T 428/23914–23993; Y10T 428/24–24025; Y10T 428/24058; Y10T 428/24124; Y10T 428/24174–24182; Y10T 428/24355; Y10T 428/249923; Y10T 428/28; Y10T 428/2839; Y10T 428/2861; Y10T 428/2973; Y10T 428/2976
USPC ...... 428/85–97, 98–101, 105, 113, 119–120, 428/141, 223, 343, 352, 355 RA, 397, 428/399

See application file for complete search history.

(56) References Cited

OTHER PUBLICATIONS

Pourahmadi, F., D. Gee, and K. Petersen. "The Effect of Corner Radius of Curvature on the Mechanical Strength of Micromachined Single-crystal Silicon Structures." TRANSDUCERS '91: 1991 International Conference on Solid-State Sensors and Actuators. Digest of Technical Papers (1991): 197-201. Print. (Year.*

International Search Report and Written Opinion of the ISA for PCT Application No. PCT/US2014/015511 dated May 7, 2014.

Tang, Tian et al., "Can a fibrillar interface be stronger and tougher than a non-fibrillar one?" Journal of the Royal Society Interface, 2(5), 505-516.

* cited by examiner

US 10,689,549 B2

MICROFIBERS WITH MUSHROOM-SHAPED TIPS FOR OPTIMAL ADHESION

STATEMENT REGARDING FEDERALLY-SPONSORED RESEARCH AND DEVELOPMENT

This invention was made with partial government support by the National Science Foundation (STIR Phase I Award Number 0930610 and IPP Award Number 0930610). The government has certain rights in this invention.

CROSS REFERENCE TO RELATED APPLICATIONS

The present application is a 35 U.S.C. 371 US national phase application of PCT international application serial number PCT/US2014/015511, filed on Feb. 10, 2014, and is herein incorporated by reference in its entirety.

FIELD OF THE INVENTION

This invention relates to optimizing the geometric parameters of microfiber-based adhesives with mushroom tips to enhance the adhesive performance of the microstructure.

BACKGROUND OF THE INVENTION

We need to look no further than nature to find inspiration for many of the technologies we work on today. One such field that observations on natural systems have impacted significantly in the recent years is adhesive technologies. While conventional adhesives rely on very soft materials or viscous liquids, nature offers a unique system composed of adhesive elements made of relatively rigid materials. These adhesive elements are comprised of millions of tiny fibers varying in size and geometrical complexity depending on the animal that bears them. Some insects, spiders, and anoles have fibers with effective diameters in the order of microns. Other animals such as the gecko lizard bear micro-scale stalks which branch down to nano-scale fibers forming intricate hierarchical structures. The common aspect of fibrillar structuring is its ability to conform to the adhering surface, improve contact area and create an attractive force between individual fibers and the surface. The cumulative effect from the adhesion contribution of every fiber in contact is capable of generating adhesive strengths up to 100 kPa as measured in the case of the gecko lizard.

A great deal of research has been performed to analyze the structure of natural fibrillar adhesives and measure their performance, understand the main principles of enhanced adhesion, and fabricate synthetic counterparts of biological fiber adhesives.

A common aspect of natural fibers among species, which is of interest in this work, is that the cross section of a natural fiber is rarely constant along its length. It gradually increases close to its terminal end forming what is referred to as mushroom-shaped fibers. While initial fabrication attempts for synthetic adhesives were limited to constant cross section cylindrical fibers, realization of the actual shape of natural fibers has led to synthetic fibers with mushroom tips. Adhesives comprised of mushroom-shaped fibers have shown significant improvements over cylindrical fibers. Furthermore, measured adhesive strengths have matched and in some instances such as smooth surface applications surpassed adhesive strengths recorded for gecko footpads.

The force required to detach a mushroom-shaped fiber is greater than that of a cylindrical fiber because the contact area for a mushroom-shaped fiber is larger. Work by del Campo et al., Del Campo A., Greiner C., Arzt E. *Langmuir* 2007, 23, 10235-10243, reports enhancements in pull-off loads as much as 40-fold with mushroom-shaped fibers over cylindrical fibers of equal height and stalk radius. Interestingly, for mushroom-shaped fibers which exhibited this enhancement, the contact area is only 1.7 times the contact area of flat tip cylindrical fibers. This fact points to the existence of an adhesion enhancement mechanism other than just the increase in contact area with mushroom-shaped fibers.

In this invention, the pull-off stress of mushroom-shaped fibers using a cohesive zone model and finite elements (FE) simulations is examined. This model is then used to determine the optimal parameters for maximum pull-off stress. Two parameters are identified for design and optimization: the edge angle of the fiber tip $\gamma$ and the ratio of the radius of the tip to the radius of the stalk $\beta$. In addition, the impact of the shape of the edge tip—where the surface and sides of the mushroom tip intersect—is evaluated and a preferred shape is identified.

While previous literature has described that microfibers with mushroom-shaped tips demonstrate enhanced adhesion when compared with cylindrical microfibers, there exists no understanding of what geometric parameters result in microfibers with optimized adhesion.

SUMMARY OF THE INVENTION

This present invention describes a set of geometric parameters to optimize the adhesion of mushroom-shaped microfibers. These parameters are obtained and verified using modeling and analytical approaches.

DETAILED DESCRIPTION OF THE INVENTION

This invention involves a dry adhesive structure and, more specifically, geometric parameters of dry adhesive microfibers with mushroom-shaped tips shape to enhance and optimize the adhesive performance of the fiber.

The application refers to the following terms, words, and phrases that have particular meaning with regards to the present invention. A geometric feature being micro or microscale means that at least one of the characteristic lengths of the feature in any 3D direction should be between 0.5-500 micrometers in length. Microfibers are microscale hairs with at least one microscale feature on them.

Figure 1:
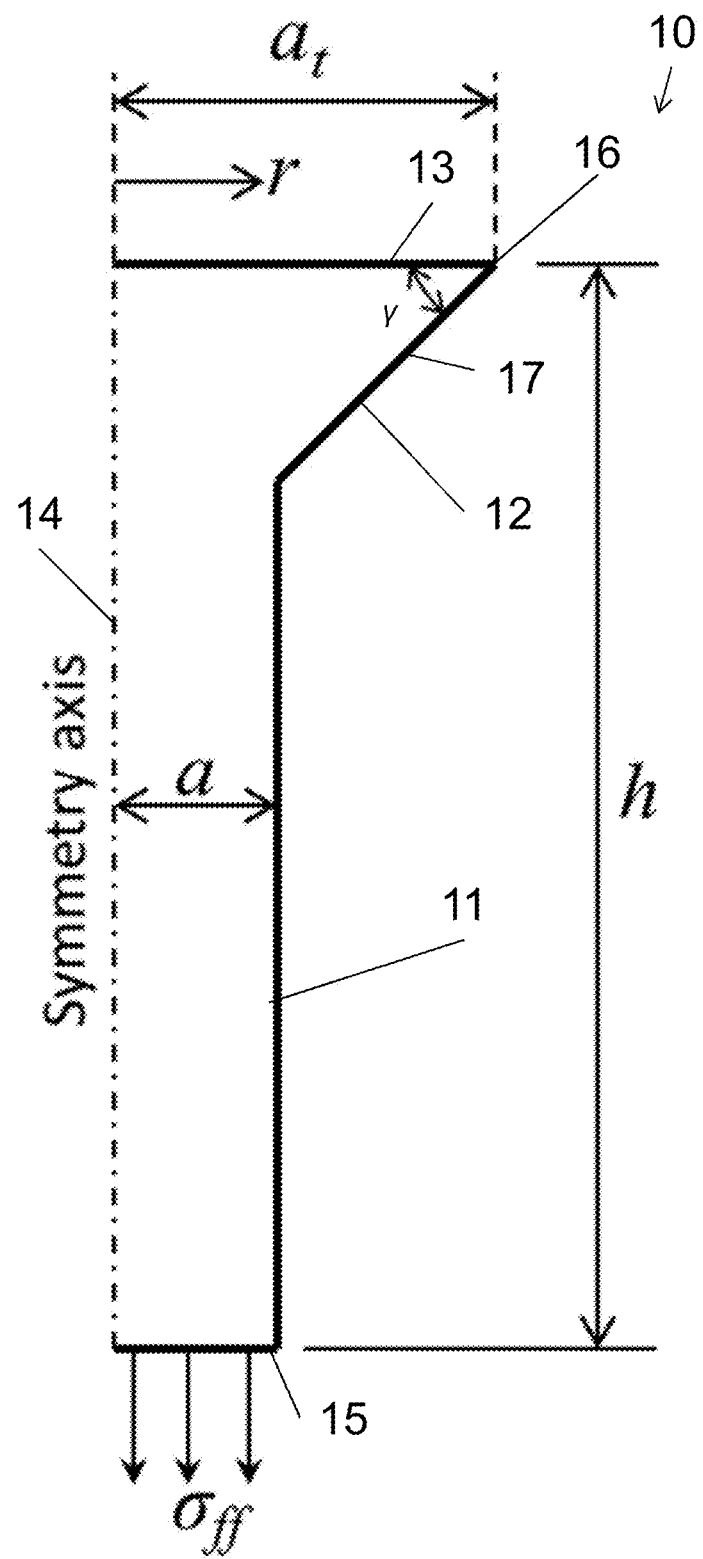
FIG. 1 illustrates a two-dimensional axial symmetry model for one embodiment of a mushroom-shaped dry adhesive fiber according to the present invention

Referring generally to FIG. 1, a two-dimensional axial symmetry model for one embodiment of the mushroom-shaped fiber 10 of the present invention is shown. Fiber 10 includes stem 11 and mushroom-shaped tip 12 with a flat surface 13. Stem 11 and tip 12 are symmetrical about symmetry axis 14, such that radius a of stem 11 (up to the point of connection with tip 12, in a preferred embodiment, is constant along the height of stem 11, and radius $a_t$ of tip 12, in a preferred embodiment, is constant at surface 13 as well and is fixed in radial direction to simulate full-friction contact. FIG. 1 also shows height h, which is the distance between the bottom 15 of stem 11 and surface 13. Thus, in a preferred embodiment, surface 13 and the cross-section of stem 11 are circular. In other embodiments, however, an oval or elliptical shape and/or cross-section may be used. The shape of the inclined sides on the underside of the mushroom tip is linear is linear in a preferred embodiment, but can be alternately convex or concave with respect to the stem axial direction and tip surface.

In operation and use, fiber 10 attaches, adheres or otherwise is joined at bottom 15 to a base or substrate (not shown). Fiber 10 is substantially perpendicular to the base or substrate. As is known in the art, surface 13 has adhesive forces that allow fiber 10 to attach and/or adhere to other objects. The present invention addresses and describes optimum parameters of fiber 10 for maximizing the adhesive force at surface 13. These parameters focus, referring to FIG. 1, on (i) wedge angle γ, (ii) the ratio β of the radius $a_t$ of the tip 12 to the radius a of the stem 11, and (iii) the sharpness or radius of curvature of the outer edge 16 formed by the surface 13 and the inclined sides 17 of the tip 12. In embodiments where $a_t$ and a are not constant, the effective radius of surface 13 and/or of the cross-section stem 11 is used. Similarly, where surface 13 is an oval or ellipse, the radius $a_t$ is determined where $a_t$ is smallest. In embodiments where sides 17 are not linear, that is, they are concave or convex, wedge angle γ is determined by using the line that is formed from edge 16 to the apex of the radius of curved side 17.

Figure 2:
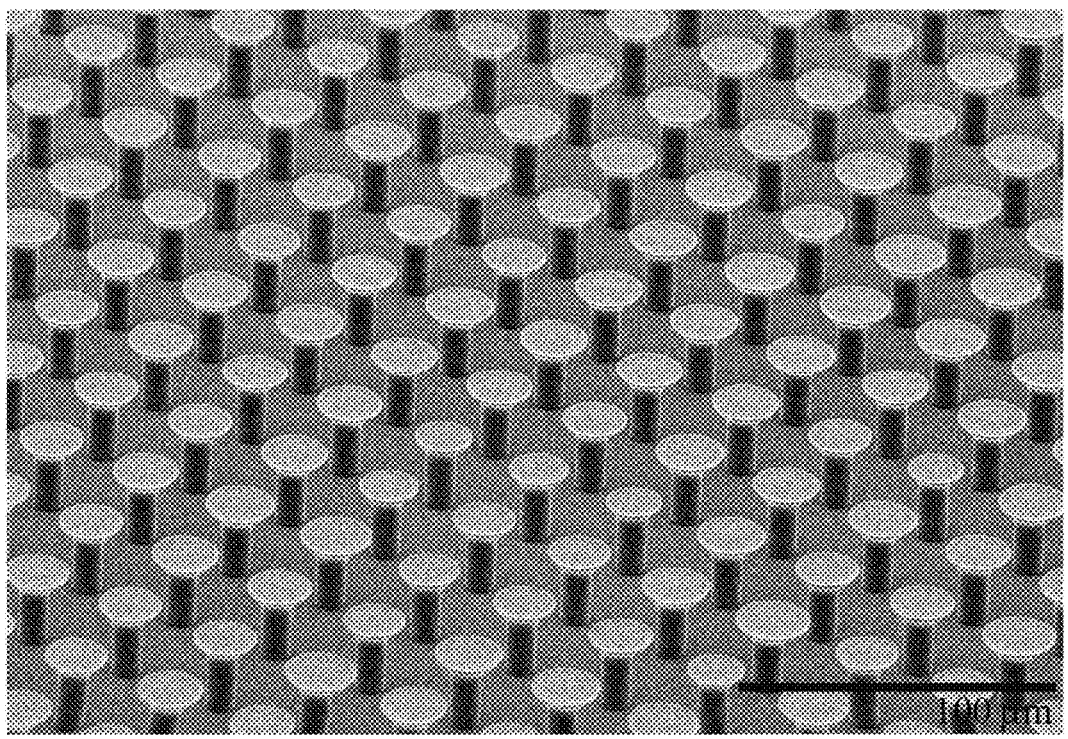
FIG. 2 is a scanning electron microscope image of a microfiber array of synthetic polyurethane mushroom-shaped fibers of the present invention with 4 μm stalk radius, 8 μm tip radius, and 20 μm length (Scale bar: 50 μm).

The height h of fiber 10 is not a controlling geometric parameter. This invention may be applied to microfibers or nanofibers currently in commercial use, including those with characteristic geometries ranging from 0.2-500 nm and 0.2-500 μm in length. As shown in FIG. 2 each fiber 10 is, in one embodiment, part of a microfiber array of synthetic polyurethane mushroom-shaped fibers of the present invention. In FIG. 2, the fibers have 4 μm stalk radius, 8 μm tip radius, and 20 μm length (Scale bar: 100 μm).

As detailed below, the pull-off stress at surface 13 is important in evaluating the adhesive forces at surface 13. In particular, pull-off stress for an individual mushroom-shaped fiber can be modelled using DB cohesive zone model and finite element ("FE") analyses. These analyses reveal critical information about the detachment mechanism of mushroom-shaped fibers and how this behaviour is influenced by the geometry and interfacial properties of fiber, namely, optimal values for the parameters β and γ, as well as the shape of the edge angle. More directly, these analyses reveal geometrical guidelines to ensure optimal, i.e., high and robust, adhesion relative to the intrinsic adhesive stress.

More specifically, the adhesion mechanism of bio-inspired mushroom-shaped fibers is investigated by implementing the Dugdale-Barenblatt cohesive zone model into FE simulations. As detailed below, these simulation show that the magnitude of pull-off stress depends on the edge angle γ and the ratio of the tip radius to the stalk radius β of the mushroom-shaped fiber. Pull-off stress is also found to depend on a dimensionless parameter x, the ratio of the fiber radius to a length-scale related to the dominance of adhesive stress. In this invention, β=1.1-1.2 and γ=45° are described as the optimal parameters for maximizing pull-off stress for a single mushroom-shaped fiber. In other embodiments of the invention, β may range from 1.05 to 1.4 and γ may range from 20° to 55° for mushroom-shaped tips geometries which demonstrate improved adhesion with respect to a cylindrical microfiber. As further detailed below, in the discussion of crack initiation and a pull-off model, the location of crack initiation is found to depend on x for a given β and γ. An analytical model for pull-off stress, which depends on the location of crack initiation as well as γ and β, is proposed and found to agree with the simulation results. In the next discussion section, the simulation results are also substantiated by a pull-off stress comparison between mushroom-shaped and cylindrical fibers. Finally, the importance of the edge angle, as a parameter, is discussed.

Cohesive Zone Model.

As a starting point, adhesion problems between surface 13 and another object in contact with surface 13 were studied using a cohesive zone model such as the Dugdale-Barenblatt (DB) model. Dugdale D. S. *J Mech Phys Solids* 1960, 8, 100-104; Barenblatt G. I. *Advances in Applied Mechanics* (eds. H. L. Dryden T.v.K.G.K.F.H.v.d.D., Howarth L.) 1962, pp. 55-129, Elsevier. It is a simple cohesive zone model where the interface between surface 13 and the object in contact with surface 13 separates when the normal interfacial stress reaches the theoretical strength of the interface $\sigma_o$. The interface continues to separate at $\sigma_o$ until the separation reaches a critical distance $\delta_c$, after which the interface can no longer support stress, resulting in the initiation of a crack between surface 13 and the object in contact with surface 13. The region where the separation of interface occurs is referred to as the cohesive zone. In this model, the work of adhesion is given by $\omega_{adh} = \sigma_o \delta_c$. Tang et al. found the pull-off force of a soft, elastic cylindrical fiber in contact with a rigid flat surface whose height is much larger than its radius using the DB cohesive zone model. Tang T., Hui C. Y., Glassmaker N. J. *J R Soc Interface* 2005, 2, 505-516. According to this study, normalized pull-off stress $\Phi \equiv \sigma_s/\sigma_o$ depends on a single dimensionless parameter x defined as:

$$\chi \equiv \frac{\sigma_o^2 a(1-\nu^2)}{2\pi E w_{adh}} = \frac{\sigma_o a(1-\nu^2)}{2\pi E \delta_c}. \quad (1)$$

Here, a is the radius, E is the elastic modulus, and $\nu$ is the Poisson's ratio of the fiber—which all can be measured for a particular fiber size and material. Work of adhesion, $\omega_{adh}$, is also a measurable quantity. Critical separation distance, $\delta_c$, is derived from van der Waals interactions. It is the distance between two flat surfaces when the interfacial attractive stress is the highest and it is usually assumed to be in the range 0.1 nm-1 nm. According to DB model, work of adhesion is the product of intrinsic adhesive strength and the critical separation distance. The intrinsic adhesive strength, $\sigma_o$, can be calculated using work of adhesion and the critical separation distance. The magnitude of intrinsic adhesive strength is limited by the Young's modulus (E) of the material for soft materials (materials with E up to 10 MPa) due to stress blunting and thermal fluctuations.

Dimensionless parameter x is the ratio of the fiber radius to a length scale related to the dominance of the interfacial adhesive forces. Hence, when x<<1, an attractive stress that is equal to the intrinsic adhesive stress covers the entire fiber tip and pull-off stress approaches the theoretical limit, $\Phi = 1$ (i.e. $\sigma_s = \sigma_o$). This regime is referred to as the flaw insensitive regime. On the other hand, when x<<1, $\sigma_o$ acts over a small portion of the interface, which results in pull-off stress being much smaller than the theoretical limit, $\sigma_s << \sigma_o$. This regime is referred to as the flaw sensitive regime. The non-dimensional parameter x is also relevant to the adhesion problem of mushroom-shaped fibers. Thus, pull-off results can be presented as a function of x, and a pull-off stress model based on x is presented below.

Figure 3A:
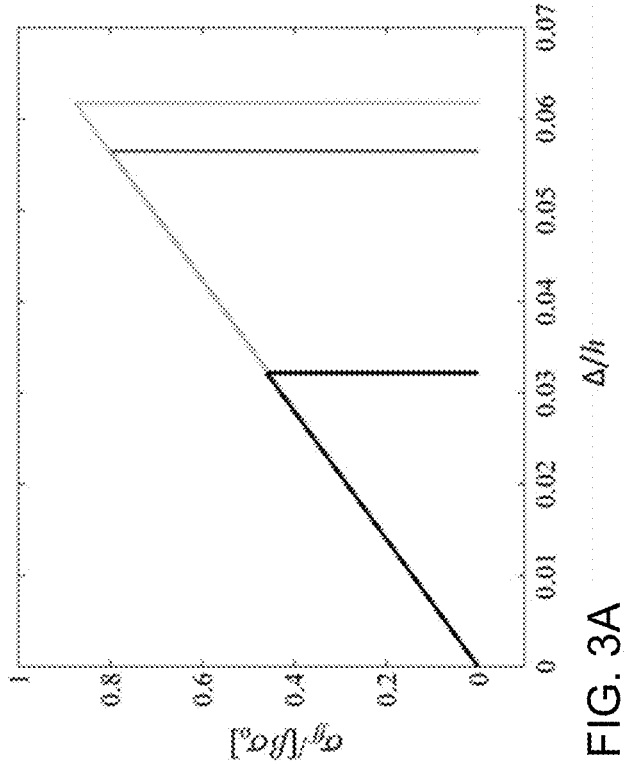
FIGS. 3(a) and 3(b) are graphs of the average tensile stress (y axis) at the tip of the mushroom-shaped fiber of the present invention with $\beta=1.2$ and $\gamma=25°$ (dark gray line), $\gamma=45°$ (light gray line), and $\gamma=75°$ (black line), as a function of (a) normalized far field displacement $\Delta/h$ (x axis in FIG. 5(a)), and (b) normalized maximum interfacial separation $\delta_m/\delta_c$ (x axis in FIG. 5(b)). Here, $\delta_c=1$ nm ($\chi=6$). Peaks in each plot for specific $\theta$ coincide and correspond to normalized pull-off stress $\Phi$. Tensile load drops immediately after the maximum interfacial separation reaches the critical separation indicating that the contact is unstable following crack initiation. The discontinuity at $\delta_m/\delta_c\sim0.1$ prior to crack initiation in (b) marks the instant when a cohesive zone starts to form.
Figure 3B:
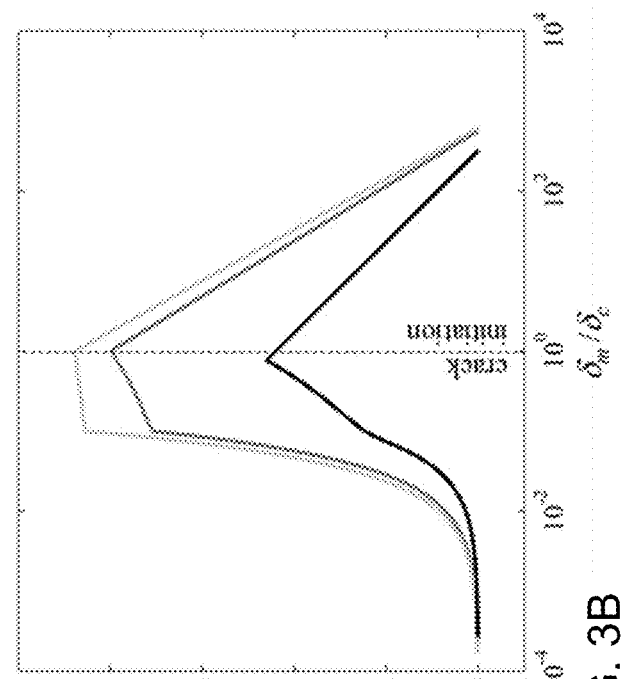
Figure 4A:
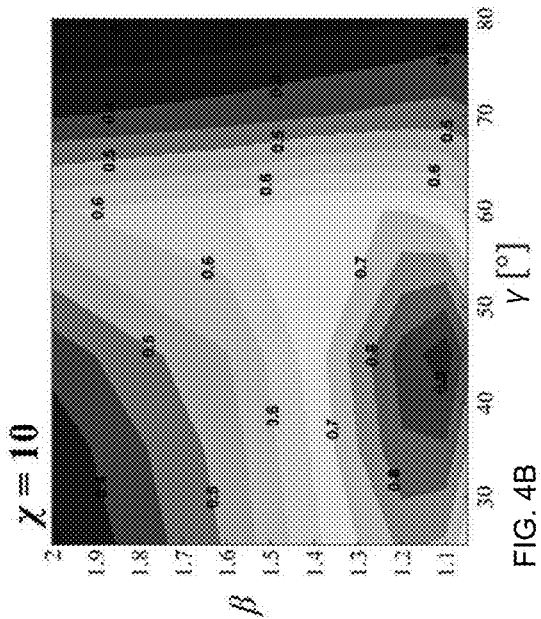
FIGS. 4(a)-4(d) are normalized pull-off stress $\Phi$ contour plots for x=5 (FIG. 4(a)), x=10 (FIG. 4(b)), x=20 (FIG. 4(c)), and x=40 (FIG. 4(d)) as a function of $\beta$ (y axis) and $\gamma$ (x axis). The peak $\Phi$ for each case lies within $\beta=1.1$-1.2 and $\gamma=45°$.
Figure 4B:
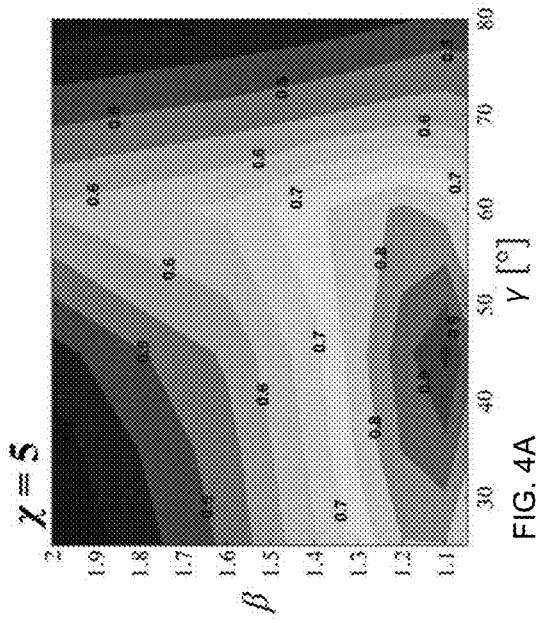
Figure 4C:
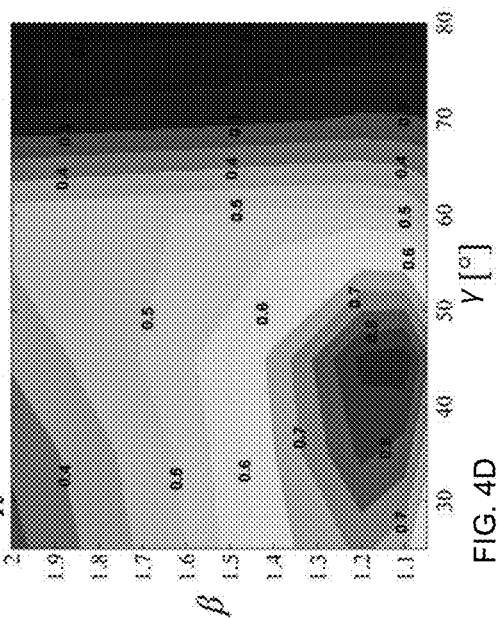
Figure 4D:
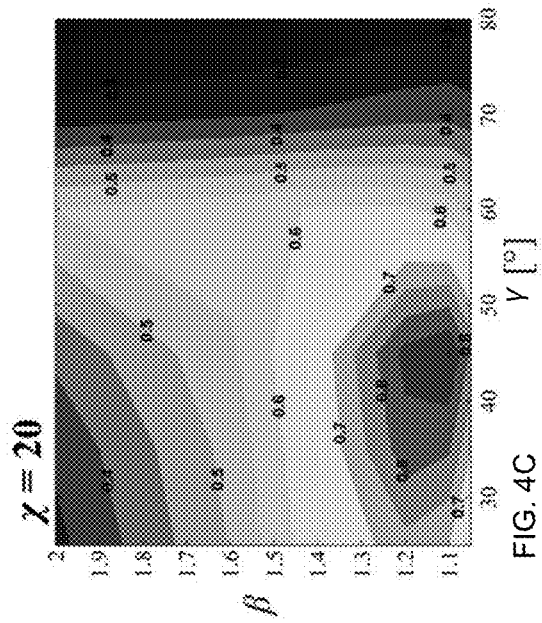

FIGS. 3(a) and 3(b) show the results of the simulations performed for a mushroom-shaped fiber illustrated in FIG. 1 using COMSOL MultiPhysics 4.3 FE analysis software. In these simulations, it is assumed that the surface 13 of fiber 10 is in full friction contact with a rigid smooth surface of another object. The DB cohesive zone model was implemented at the tip of the fiber in FE simulations and modified slightly to avoid divergence. Step function from zero stress to $\sigma_o$ in the cohesive zone was replaced with a high stiffness relation between the attractive stress and interfacial opening where the interface is required to separate by 10% of $\delta_c$ before cohesive zone forms (i.e., before $\sigma_o$ is reached). Aksak B., Hui C. Y., Sitti M. *J R Soc Interface* 2011, 8, 1166-1175. Unless stated otherwise, the simulation parameters are a=1 µm, E=3 MPa, $\nu$=0.5, and $\sigma_o$=100 kPa. In the simulation, the tip radius $a_t$ varies from 1.05 µm to 2 µm while the edge angle $\gamma$ varies from 25° to 80°. It is important to note that the tip edge or corner 16 forms a wedge with a wedge angle that is also equal to $\gamma$. The effect of wedge angle of edge 16 being different from $\gamma$ is addressed below in the discussion of the impact of the edge angle. The height of the fiber h is fixed at 10 µm. Dimensionless parameter x is varied by changing $\delta_c$ for fixed $a_t$, E, $\nu$, and $\sigma_o$. While applying displacement $\Delta$ gradually to the base of the fiber, pull-off load is determined from the far field tensile stress $\sigma_f$ the fiber bears when the maximum interfacial separation equals $\delta_c$. The tensile load reaches its maximum at the instant $\delta_c$ is reached at the interface as shown in FIG. 3(a). Knowing pull-off load $p_s$, pull-off stress is calculated from $\sigma_s = p_s/(\pi a_t^2)$.

Peaks in each plot for specific $\gamma$ coincide and correspond to normalized pull-off stress $\Phi$. Tensile load drops immediately after the maximum interfacial separation reaches the critical separation indicating that the contact is unstable following crack initiation. As shown in FIG. 3(b), the discontinuity at $\delta_m/\delta_c \sim 0.1$ prior to crack initiation marks the instant when a cohesive zone starts to form.

Pull-off stress for all tip-to-base ratios $\beta \equiv a_t/a$ and edge angles $\gamma$ are shown for select x values in FIGS. 4(a)-(d). Contour plots show clear peaks at $\beta=1.1$-$1.2$ and $\gamma=45°$ suggesting that these values are optimal for maximum pull-off stress. In addition, the peak pull-off stress drops with increasing x with highest value at $\Phi=0.97$ for x=5 and lowest value at $\Phi=0.88$ for x=40 both obtained for $\beta=1.1$ and $\gamma=45°$.

Figure 5B:
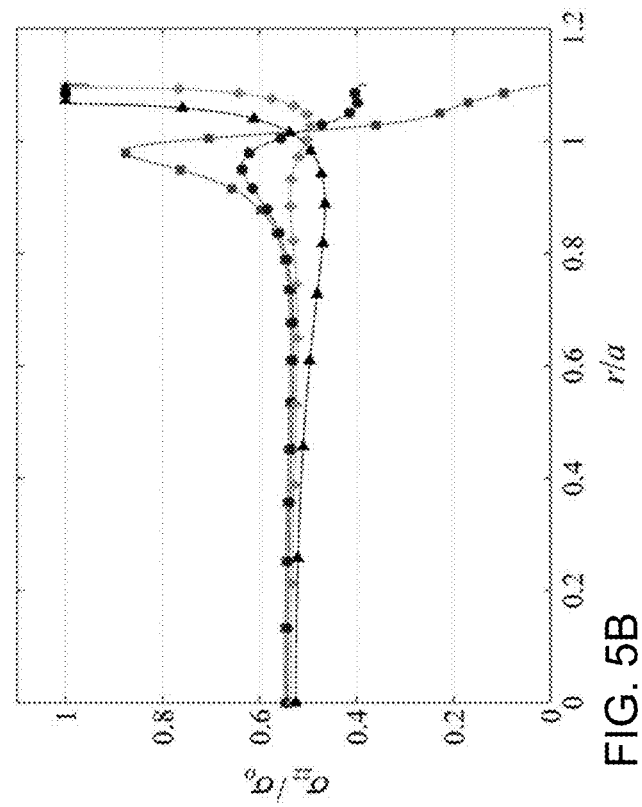
FIGS. 5(a) and 5(b) are graphs of normalized pull-off stress (y axis) at the tip of a mushroom-shaped fiber of the present invention with $\beta=1.1$ and $\gamma=\{25°, 45°, 60°, 80°\}$ as a function of (a) x (x axis), and (b) r/a (x axis) for Δ/h=0.0217. A cohesive zone is present at the edge both for γ=60° and γ=80° while it has not formed for γ=25° and γ=45° yet.
Figure 5A:
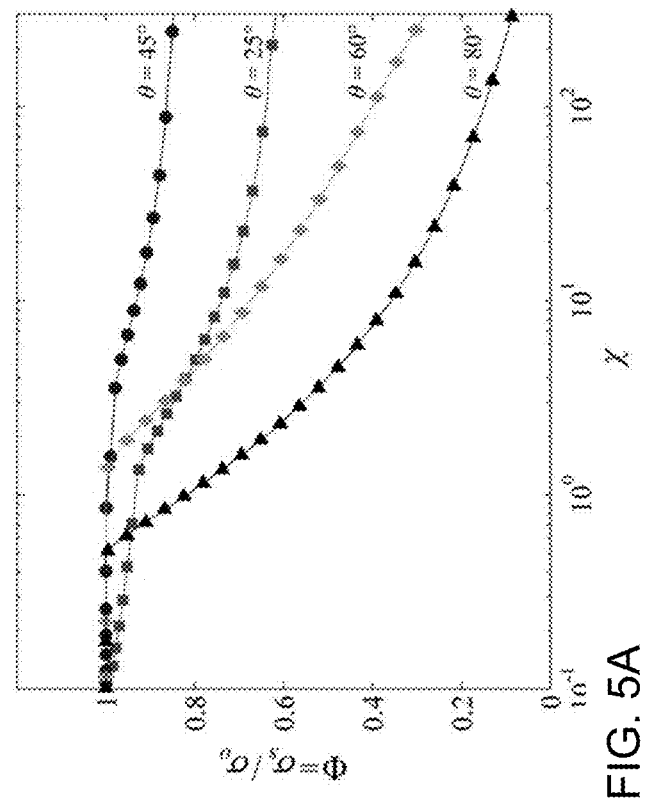

FIG. 5(a) shows pull-off stress for $\beta=1.1$ for all $\gamma$ as a function of x. In line with the data presented in FIGS. 4(a)-(d), $\gamma=45°$ yields the highest pull-off stress for all x, except when x<<1 (shown at the left of FIG. 5(a). In the regime where x<<1, pull-off is flaw insensitive, and it is expected that $\Phi=1$ regardless of $\beta$, $\gamma$, and x.

FIG. 5(a) further shows that for $\gamma \leq 45°$, pull-off stress saturates towards a constant value as x increases. In contrast for $\gamma > 45°$, pull-off stress continuously drops with increasing x. The dependence of pull-off stress on the wedge angle at the limit $\chi \to \infty$ (i.e. $\delta_c \to 0$) is reinforced using Bogy's study on stress singularities at bimaterial wedge interfaces. Carbone G., Pierro E., Gorb S. N. *Soft Matter* 2011, 7, 5545-5552. For a soft incompressible elastomer (i.e., Poisson's ratio, $\nu=0.5$) in contact with a rigid substrate, stress at the edge of the fiber tip is finite for $\gamma \leq 45°$ and singular for $\gamma > 45°$. Stress profiles of a mushroom-shaped fiber with $\beta=1.1$ and $\gamma=\{25°, 45°, 60°, 80°\}$ are shown for a far field displacement of $\Delta/h=0.0217$ in FIG. 5(b). Due to the singularity, a cohesive zone is present at the edge of the fiber both for $\gamma=60°$ and $\gamma=80°$ while cohesive zone has not formed, as yet, for $\gamma=25°$ and $\gamma=45°$. Assuming that $\delta_c=0$, this implies that pull-off will occur shortly after the maximum tensile stress at the interface reaches $\sigma_o$. If there is a stress singularity at the edge of the tip, normal stress will be equal to $\sigma_o$ at the edge the moment a tensile load is applied to the fiber. The interface will open starting at the edge and pull-off will depend on whether this opening is less than or equal to $\delta_c$. On the other hand, if stress is finite everywhere at the interface, a sufficiently large tensile load has to be applied before a cohesive zone starts forming. This implies that regardless of the value of $\delta_c$, pull-off load has a finite lower limit when $\gamma \leq 45°$. The existence of this lower limit provides robust adhesion because regardless of the value of x, one can expect to obtain pull-off stress equal to at least this lower. In particular for fibers with $\gamma=45°$ and $\beta=1.1$-$1.2$, this lower limit for normalized pull-off stress is remarkably $\Phi=0.85$ which ensures high and robust adhesion. Stated differently, these results demonstrate that, no matter what the interfacial values may be, 85% of intrinsic adhesive strength can be recovered if there is not singularity present. Thus confirming that optimum adhesion can be obtained at $\gamma=45°$.

FIGS. 4(a)-(d) and 5(a) and (b), together, show preferred values for $\gamma$ and $\beta$ when x ranges from 1 to 100. In particular, within this range for x, normalized pull-off stress of 0.7-0.9 is observed where the ratio of $a_t/a$ is 1.05-1.4, and wedge angle $\gamma$ is 20-55. In the same range, pull-off stress of 0.8-0.9 is observed where the ratio of $a_t/a$ is 1.1-1.2, and wedge angle $\gamma$ is 40-50. Finally, an optimum of pull-off stress of 0.9 or greater is obtained where the ratio of $a_t/a$ is 1.1-1.2, and wedge angle $\gamma$ is 45.

Crack Initiation and Pull-Off Model.

The location of crack initiation (i.e. where the interface opening equals $\delta_c$) is also dependent both on tip shape parameters $\gamma$ and $\beta$, and the value of x. For $\gamma \leq 45°$, since normal stress is finite everywhere at the tip, the cohesive zone forms when and where the maximum normal stress reaches $\sigma_o$. This location corresponds to r/a=0 (center) for $\gamma=45°$ and all $\beta$ [refer to FIG. 5(b) for normal stress profiles]. Simulation results show that the location of crack initiation is independent of x for this set of tip parameters. For $\gamma>45°$ on the other hand, the crack initiation is always at the edge for sufficiently large x. For certain combinations of $\beta$ and $\gamma$, for instance $\beta=1.4$ and $\gamma=60°$, although the normal stress at the tip is highest at the edge, it does not increase monotonically from the center to the edge of the tip. Stress profile has a minimum at r/a~1 [FIG. 5(b)]. For sufficiently low x, gradually increasing far field displacement causes a cohesive zone to form at the edge first. Since $\delta_c$ is relatively large for low x, an increase in tension does not immediately result in a crack to initiate at the edge. In the meantime, the stress in the center gradually increases reaching $\sigma_o$ where a second cohesive zone starts to form. The center separates faster than the edge which results in a crack to initiate at the center. The simulations, therefore, lead to the conclusion that crack initiation switches to the center of the fiber if stress at the center is able to reach $\sigma_o$ prior to a crack initiating at the edge.

Similar to the pull-off stress model proposed by Tang et al., as derived with the assumption that the size of the cohesive zone is much smaller compared to the tip radius, pull-off stress can be estimated according to where the crack initiates as:

$$\Phi = \frac{\sigma_s}{\sigma_o} \begin{cases} B_e[\beta\chi]^{-\alpha} & \text{for edge crack,} \quad (2a) \\ B_c[\beta\chi]^{-0.5} + \Gamma_c & \text{for center crack} \end{cases} \quad (2b)$$

Figure 6B:
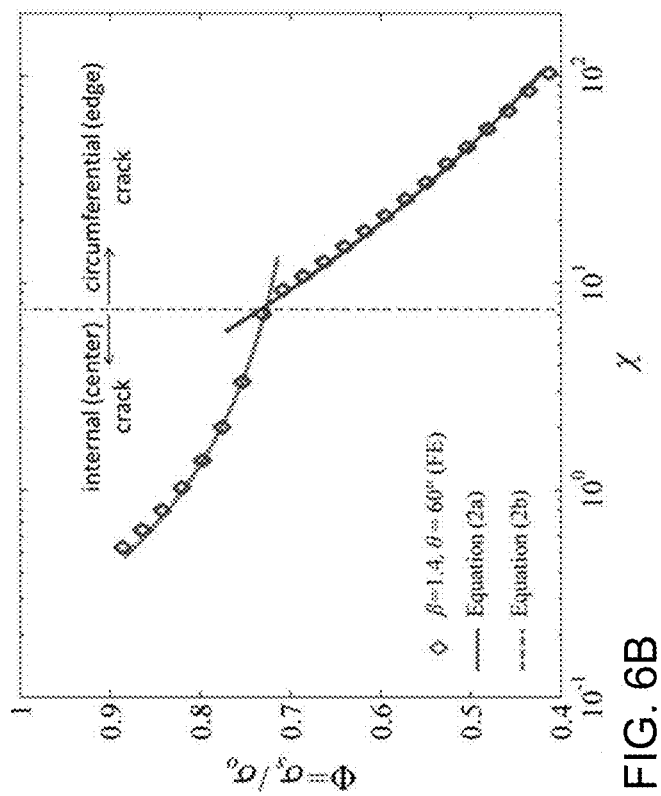
FIG. 6(b) is a graph of simulation results (triangle markers) of normalized pull-off stress (y axis) at the tip of a mushroom-shaped fiber of the present invention for β=1.4, and γ=60° as a function of x (x axis), where a crack initiates at the edge for x>7 and at the center for x<7. Solid line represents equation (2a) with $B_e$=1.2 and a=0.21. Dashed line represents equation (2b) with a=0.17 and $Γ_c$=0.68.
Figure 6A:
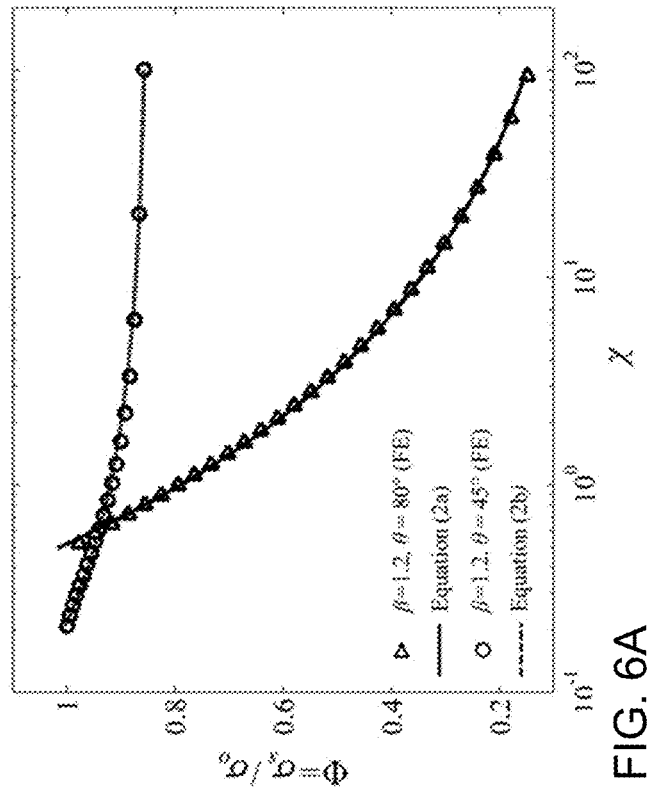
FIG. 6(a) is a graph of simulation results (triangle markers) of normalized pull-off stress (y axis) at the tip of a mushroom-shaped fiber of the present invention for β=1.2, and γ=80° as a function of x (x axis), where a crack initiates at the edge for all x. Solid line represents equation (2a) with $B_e$=0.84 and a=0.36. Also included are the simulation results (circle markers) for β=1.2 and γ=45° where a crack initiates at the center for all x. Dashed line represents equation (2b) with $B_c$=0.076 and $Γ_c$=0.85.

For a crack initiating at the center, there is a square-root singularity and thus a=0.5 as shown in equation (2b). Numerical constants $B_e$ and $B_e$ are form factors which are determined by fitting equation (2a) and equation (2b) to the simulation data for given $\beta$, $\gamma$, and x. Constant $\Gamma_c$ is approximately the value of the pull-off stress when the crack initiation switches from the edge to the center of the fiber for $\gamma>45°$. Constant $\Gamma_e$ is determined by fitting equation (2b) to simulation data. For $\gamma\leq45°$ and a crack initiating at the center for all x, $\Gamma_c$ is the lower bound for normalized pull-off stress at the limit x→∞. FIG. 6 shows the simulation data and the model fits using equation (2a) and equation (2b). The proposed model is in agreement with the simulation data except when x→0. Equations 2(a) and (b) are not valid in this regime as the cohesive zone occupies a relatively larger portion of the tip. Additionally, for certain combinations of $\beta$ and $\gamma$, a crack initiates at r/a~1 due to a stress peak at this location. Equations 2(a) and (b) also are not valid in this case.

Crack initiation at the center of the fiber shown in simulations was also seen experimentally by Varenberg et al., Varenberg M., Gorb S. J R Soc Interface 2008, 5, 785-789, and Murphy et al., Murphy M. P., Aksak B., Sitti M. Small 2009, 5, 170-175. Varenberg et al. presented experimental results with mushroom-shaped fibers using high speed imaging and showed that the detachment of the fiber was initiated with an internal crack. Similarly, Murphy et al. observed under tensile loading of polyurethane mushroom-shaped fibers that an internal crack formed and propagated in a matter of milliseconds leading to contact failure.

These simulation results all suggest that in the flaw insensitive regime where x<<1, regardless of the value of $\gamma$ and $\beta$, $\Phi=1$. Further, when x ranges from 1-100, these results show preferred values of $\gamma$ and $\beta$ to optimize adhesion.

Pull-Off Stress Comparison Between Mushroom-Shaped and Cylindrical Fibers.

For x<<1, i.e., for very small fiber radius (typically less than 1 µm), pull-off stress equals intrinsic adhesive stress and is insensitive to the tip shape. This is in agreement with the simulation results outlined above. However, for large x, tip shape significantly affects adhesion. del Campo et al. measured pull-off loads for mushroom-shaped fibers and cylindrical fibers of the same height; stalk radius and packing density. While this study measured approximately 0.7 mN for cylindrical fibers with a hemispherical glass indenter, the measured pull-off load was approximately 28 mN with mushroom-shaped fibers, an enhancement of 40-fold. Reported values are approximate pull-off loads near saturation as interpreted from the graphical data presented in del Campo et al. An enhancement factor e can be defined as the ratio of the pull-off load between two different fiber arrays. For an experiment that uses hemispherical glass indenter with a radius much larger than the dimensions of an individual fiber in the array, the enhancement factor of mushroom-shaped fibers over the cylindrical fibers with the same packing density, stalk radius, height, and material becomes:

$$e = \frac{P_{s,m}}{P_{s,c}} = \beta^4 \left(\frac{\sigma_{s,m}}{\sigma_{s,c}}\right)^2 \quad (3)$$

Here, $P_m$ and $P_c$ are the pull-off loads for the mushroom-shaped and cylindrical fiber arrays, respectively. The del Campo et al experiments were carried out with polydimethylsiloxane (PDMS) cylindrical and mushroom-shaped fibers. For cylindrical fibers, a=10 µm and h=25 µm. The tip radius for mushroom-shaped fibers were $a_t=13$ µm and they shared the same a and h with the cylindrical fibers. For both samples, the packing densities (number of fibers per unit area) were the same. According to the model of the present invention, $\beta=1.3$ and although the edge angle was not reported in the del Campo et al work, $\gamma=45°$ is assumed for simplicity. For $\beta=1.3$ and $\gamma=45°$, a conservative estimate of normalized pull-off stress according to the model of the present invention is $\sigma_{s,m}=\Gamma_c\sigma_o=0.74\sigma_o$. For cylindrical fibers, $\sigma_{s,c}=0.83x^{-0.4}\sigma_o$ as shown by Tang et al. For the described fiber arrays, equation (3) becomes $e=2.27\chi^{0.8}$. If PDMS is assumed to be incompressible (v=0.5) with elastic modulus E=1.42 MPa, for glass-PDMS contact, $\omega_{adh}=25$ mJ/m². If an intrinsic adhesive stress of $\sigma_o=1$ MPa is also assumed (a reasonable value for PDMS), plugging in the material properties, interfacial properties and fiber dimensions into equation (1), one finds x=33.6, and, in turn, e=38. This estimate is close to e=40 that del Campo et al. obtained in their measurements.

Implication of Edge Angle.

Figure 7B:
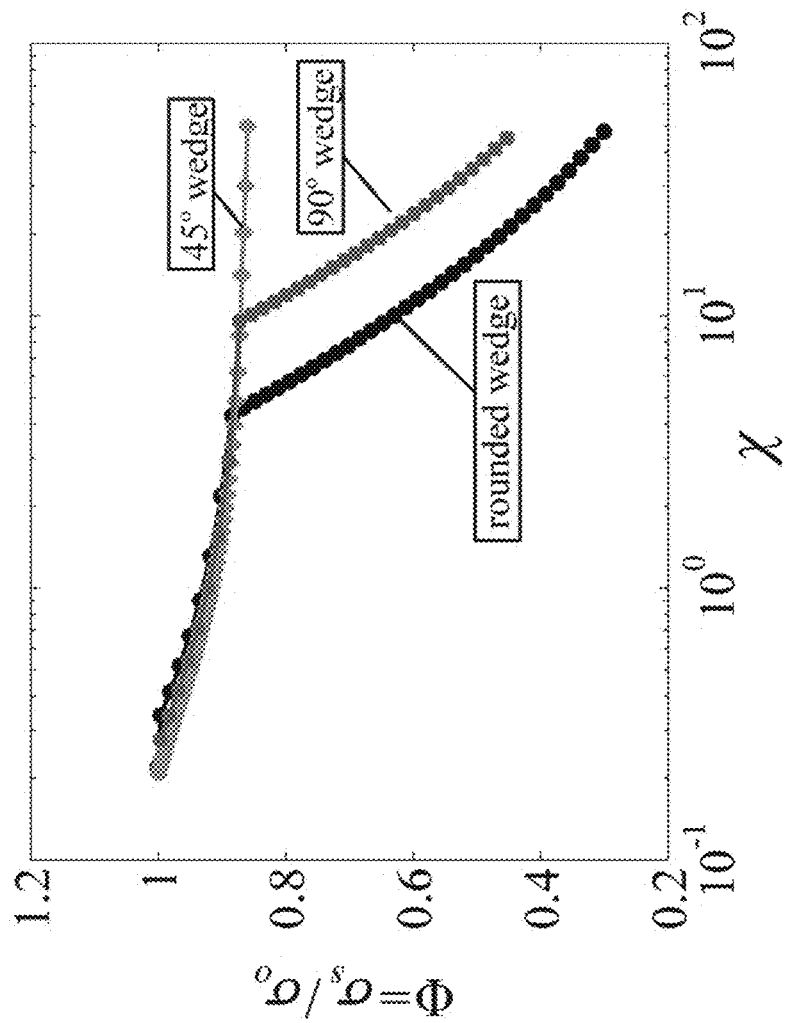
FIG. 7(b) is a graph of simulation results of normalized pull-off stress (y axis) at the tip of a mushroom-shaped fiber of the present invention for β=1.2, and γ=45° as a function of x (x axis) for 45° wedge (diamond markers), 90° wedge (square markers), and rounded wedge (circular markers).
Figure 7A:
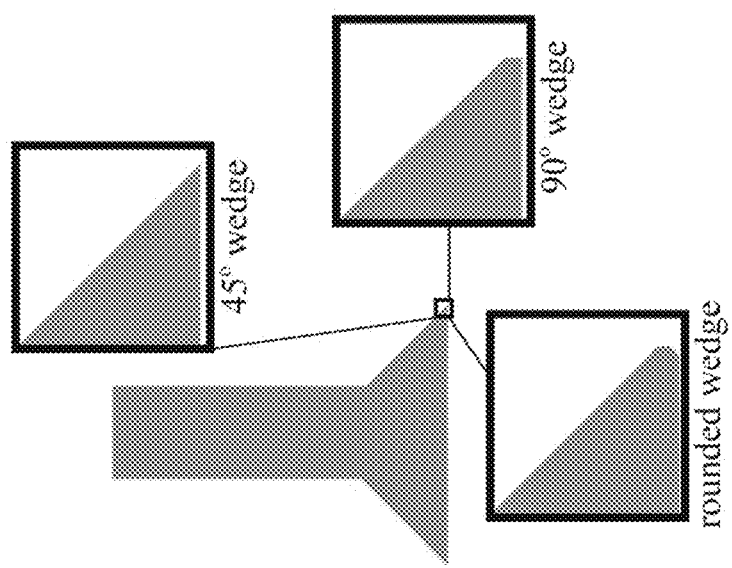
FIG. 7(a) is an Illustration of three different edge angles for the mushroom-tipped fibers.

The manufacturing technique used to fabricate mushroom-shaped fibers may not yield a sharp edge or corner (i.e. wedge) for individual fibers at the edge 16 of the tip. This implies that the wedge angle will be different from the angle of edge 16 defined in this work which may significantly affect the pull-off stress. To demonstrate this effect, simulations for mushroom-shaped fibers were performed with $\beta=1.2$ and $\gamma=45°$ employing three different edge shapes; namely 45° edge, 90° edge and rounded edge, as shown in FIG. 7(a). The radius of curvature was set to 10 nm for the rounded edge. In case of the 90° edge, a 10 nm high rectangle was added to the tip. For all three cases, the size of the tip in contact was kept at 1.2 μm ensuring constant $\beta=1.2$. As shown in FIG. 7(b), the shape of the edge angle has significant effect on pull-off stress for relatively high x values where a crack initiates at the edge 16 for both the rounded and 90° edge. Below a critical x where a crack initiation transitions to the center, pull-off stress for all three cases follow the same path once a crack is initiated at the center indicating little dependence on edge angle. Thus, a qualitative argument suggests that while fibers with small diameters and high elastic modulus (large x) favor edge angle independence, the dependence of pull-off stress to the edge angle is less significant for high strength interfaces (small x). This is assuming that the critical separation distance is in the order of 1 nm and somewhat constant for van der Waals interactions.

In practical application, the fiber material and manufacturing process provide limitations on the ability to obtain a true sharp angle for edge 16. Wetting properties also impact this process, with wetting allowing for sharper edges. In a preferred embodiment, wetted polymer materials are used to maximize the sharpness of the edge 16. However, materials and manufacturing limitations will still provide some radius of curvature. A preferred radius of curvature for maximum sharpness in this preferred embodiment is less than or equal to 10 nm. For other materials, maximum sharpness, with the smallest radius of curvature possible—given the material, wetting properties and manufacturing process—is preferred in order to optimize the edge shape parameter. In these cases, microfibers with a sharpness of the edge 16 with radius of curvature of 0.1 nm up to 10 μm will still demonstrate stronger adhesion when compared with microfibers with larger edge 16 radius of curvature.

In summary, pull-off stress for an individual mushroom-shaped fiber was modelled using DB cohesive zone model and FE analyses. This study revealed critical information about the detachment mechanism of mushroom-shaped fibers and how this behaviour is influenced by the geometry as well as the interfacial properties. A simple geometrical guideline to ensure high and robust adhesion relative to the intrinsic adhesive stress was offered. While these results are important for designing dry fibrillar adhesives, they are only concerned with the performance when the loading is in the axial direction of fibers. The effect of shear loading should also be considered along with the results of this study in designing fibrillar adhesives.

This invention may be applied to design mushroom-tipped microfibers with optimized tip geometry for maximum pull-off adhesion. Individual mushroom-tipped microfibers may be incorporated into arrays of microfibers to produce surfaces, such as two dimensional flexible or rigid tapes or the flat or curved surfaces of molded three dimensional objects, with high adhesion to a broad range of substrates. These materials with high adhesion surfaces have value across a broad range of industries and markets. This invention will add value to any microfiber-based adhesive with mushroom tip shape by increasing the adhesive ability of each microfiber, resulting in a product capable of stronger adhesion per unit area. This increase in adhesion will enable access to new product markets where stronger interfacial adhesion strength is required. Additionally, it will reduce the surface area of the product required to meet a target adhesion specification, resulting in a more cost-effective solution as well as minimizing the packaging of the product, which may additionally open up new product applications with space constraints.

More specifically, this invention may be applied to design mushroom-shaped tip microfibers with optimized tip geometry for maximum pull-off adhesion. Individual mushroom-tipped microfibers may be incorporated into arrays of microfibers to produce surfaces, such as two dimensional flexible or rigid tapes or the flat or curved surfaces of molded three dimensional objects, with high adhesion to a broad range of substrates. These materials with high adhesion surfaces have value across a broad range of industries and markets. This invention will add value to any microfiber-based adhesive with a mushroom tip shape by increasing the adhesive ability of each microfiber, resulting in a product capable of stronger adhesion per unit area. This increase in adhesion will enable access to new product markets where stronger interfacial adhesion strength is required. Moreover, it will reduce the surface area of the optimized mushroom-tipped microfiber array required to meet a target adhesion specification (when compared with a suboptimal mushroom-tipped microfiber array). This means that consumers of mushroom-tipped-microfiber arrays which make use of the invention will need fewer units of the adhesive product to accomplish the same adhesive objective when compared with suboptimal product. The resulting performance enhancement made possible by the invention reduces the input material required to manufacture each unit of adhesion, and thus the cost of producing mushroom-based microfiber adhesives is also reduced. These cost savings can be passed on to consumers, resulting in a product which can be more competitively priced than competing suboptimal adhesives. This performance optimization also results in reduced shipping costs per unit of adhesion, as well as reduced packaging costs, additionally enhancing the competitive price advantage made possible by this invention. These optimized adhesives also allow access to applications where space constraints are critical, where suboptimal adhesives may not be able to provide the necessary adhesive strength for an established product size Areas of the mushroom-shaped microfibers of the present invention are made through molding processes including vacuum-assisted or non-vacuum assisted manual or automated processes. One potential manufacturing method for areas of optimized mushroom-tipped microfibers is roll-to-roll manufacturing of continuous tapes. Other molding processes which may be used to produce these microfibers include, but are not limited to:

A. Injection molding: Injection over molding, Co-injection molding, Gas assist injection molding, Tandem injection molding, Ram injection molding, Micro-injection molding, Vibration assisted molding, Multiline molding, Counter flow molding, Gas counter flow molding, Melt counter flow molding, Structural foam molding, Injection-compression molding, Oscillatory molding of optical compact disks, Continuous injection molding, Reaction injection molding (Liquid injection molding, Soluble core molding, Insert molding), and Vacuum Molding;

B. Compression molding: Transfer molding, and Insert molding;

C. Thermoforming: Pressure forming, Laminated sheet forming, Twin sheet thermoforming, and Interdigitation;

D. Casting: Encapsulation, Potting, and impregnation;

E. Coating Processes: Spray coating, Powder coatings, Vacuum coatings, Microencapsulation coatings, Electrodeposition coatings, Floc coatings, and Dip coating;

F. Blow molding: Injection blow molding, Stretch blow molding, and Extrusion blow molding;

G. Vinyl Dispersions: Dip molding, Dip coatings, Slush molding, Spray coatings, Screened inks, and Hot melts; and H. Composite manufacturing techniques involving molds: Autoclave processing, Bag molding, Hand lay-up, and Matched metal compression.

In one preferred embodiment of the invention, the microfibers are produced from polyurethane having a 60 Shore A hardness. In other embodiments, the microfibers may have a hardness ranging from 10 Shore A to 100 Shore D. In other embodiments of the invention, the mushroom-tipped microfibers with optimized tip geometry can be produced from any moldable plastic, including:

A. Thermosets:
i. Formaldehyde Resins (PF, RF, CF, XF, FF, MF, UF, MUF);
ii. Polyurethanes (PU);
iii. Unsaturated Polyester Resins (UP);
iv. Vinylester Resins (VE), Phenacrylate Resins, Vinylester Urethanes (VU);
v. Epoxy Resins (EP);
vi. Diallyl Phthalate Resins, Allyl Esters (PDAP);
vii. Silicone Resins (Si); and
viii. Rubbers: R-Rubbers (NR, IR, BR, CR, SBR, NBR, NCR, IIR, PNR, SIR, TOR, HNBR), M-Rubbers (EPM, EPDM, AECM, EAM, CSM, CM, ACM, ABM, ANM, FKM, FPM, FFKM), O-Rubbers (CO, ECO, ETER, PO), Q-(Silicone) Rubber (MQ, MPQ, MVQ, PVMQ, MFQ, MVFQ), T-Rubber (TM, ET, TCF), U-Rubbers (AFMU, EU, AU) Text, and Polyphosphazenes (PNF, FZ, PZ)

B. Thermoplastics
i. Polyolefins (PO), Polyolefin Derivates, and Copoplymers: Standard Polyethylene Homo- and Copolymers (PE-LD, PE-HD, PE-HD-HMW, PE-HD-UHMW, PE-LLD); Polyethylene Derivates (PE-X, PE+PSAC); Chlorinated and Chloro-Sulfonated PE (PE-C, CSM); Ethylene Copolymers (ULDPE, EVAC, EVAL, EEAK, EB, EBA, EMA, EAA, E/P, EIM, COC, ECB, ETFE; Polypropylene Homopolymers (PP, H-PP)
ii. Polypropylene Copoplymers and -Derivates, Blends (PP-C, PP-B, EPDM, PP+EPDM)
iii. Polybutene (PB, PIB)
iv. Higher Poly-a-Olefins (PMP, PDCPD)
v. Styrene Polymers: Polystyrene, Homopolymers (PS, PMS); Polystyrene, Copolymers, Blends; Polystyrene Foams (PS-E, XPS)
vi. Vinyl Polymers: Rigid Polyvinylchloride Homopolymers (PVC-U); Plasticized (Soft) Polyvinylchloride (PVC-P); Polyvinylchloride: Copolymers and Blends; Polyvinylchloride: Pastes, Plastisols, Organosols; Vinyl Polymers, other Homo- and Copolymers (PVDC, PVAC, PVAL, PVME, PVB, PVK, PVP)
vii. Fluoropolymers: FluoroHomopolymers (PTFE, PVDF, PVF, PCTFE); Fluoro Copolymers and Elastomers (ECTFE, ETFE, FEP, TFEP, PFA, PTFEAF, TFEHFPVDF (THV), [FKM, FPM, FFKM])
viii. Polyacryl- and Methacryl Copolymers
ix. Polyacrylate, Homo- and Copolymers (PAA, PAN, PMA, ANBA, ANMA)
x. Polymethacrylates, Homo- and Copolymers (PMMA, AMMA, MABS, MBS)
xi. Polymethacrylate, Modifications and Blends (PMMI, PMMA-HI, MMA-EML Copolymers, PMMA+ABS Blends
xii. Polyoxymethylene, Polyacetal Resins, Polyformaldehyde (POM): Polyoxymethylene Homo- and Copolymers (POM-H, POM-Cop.); Polyoxymethylene, Modifications and Blends (POM+PUR)
xiii. Polyamides (PA): Polyamide Homopolymers (AB and AA/BB Polymers) (PA6, 11, 12, 46, 66, 69, 610, 612, PA 7, 8, 9, 1313, 613); Polyamide Copolymers, PA 66/6, PA 6/12, PA 66/6/610 Blends (PA+: ABS, EPDM, EVA, PPS, PPE, Rubber); Polyamides, Special Polymers (PA NDT/INDT [PA 6-3-t], PAPACM 12, PA 6-I, PA MXD6 [PARA], PA 6-T, PA PDA-T, PA 6-6-T, PA 6-G, PA 12-G, TPA-EE); Cast Polyamides (PA 6-C, PA 12-C); Polyamide for Reaction Injection Molding (PA-RIM); Aromatic Polyamides, Aramides (PMPI, PPTA)
xiv. Aromatic (Saturated) Polyesters: Polycarbonate (PC); Polyesters of Therephthalic Acids, Blends, Block Copolymers; Polyesters of Aromatic Diols and Carboxylic Acids (PAR, PBN, PEN)
xv. Aromatic Polysulfides and Polysulfones (PPS, PSU, PES, PPSU, PSU+ABS): Polyphenylene Sulfide (PPS); Polyarylsulfone (PSU, PSU+ABS, PES, PPSU)
xvi. Aromatic Polyether, Polyphenylene Ether, and Blends (PPE): Polyphenylene Ether (PPE); Polyphenylene Ether Blends
xvii. Aliphatic Polyester (Polyglycols) (PEOX, PPDX, PTHF)
xviii. Aromatic Polyimide (PI): Thermosetting Polyimide (PI, PBMI, PBI, PBO, and others); Thermoplastic Polyimides (PAI, PEI, PISO, PMI, PMMI, PESI, PARI);
xiv. Liquid Crystalline Polymers (LCP)
xv. Ladder Polymers: Two-Dimensional Polyaromates and -Heterocyclenes: Linear Polyarylenes; Poly-p-Xylylenes (Parylenes); Poly-p-Hydroxybenzoate (Ekonol); Polyimidazopyrrolone, Pyrone; Polycyclone
xvi. Biopolymers, Naturally Occurring Polymers and Derivates: Cellulose- and Starch Derivates (CA, CTA, CAP, CAB, CN, EC, MC, CMC, CH, VF, PSAC); 2 Casein Polymers, Casein Formaldehyde, Artificial Horn (CS, CSF); Polylactide, Polylactic Acid (PLA); Polytriglyceride Resins (PTP®); xix. Photodegradable, Biodegradable, and Water Soluble Polymers;
xvii. Conductive/Luminescent Polymers;
xviii. Aliphatic Polyketones (PK);
xix. Polymer Ceramics, Polysilicooxoaluminate (PSIOA);
xx. Thermoplastic Elastomers (TPE): Copolyamides (TPA), Copolyester (TPC), Polyolefin Elastomers (TPO), Polystyrene Thermoplastic Elastomers (TPS), Polyurethane Elastomers (TPU), Polyolefin Blends with Crosslinked Rubber (TPV), and Other TPE, TPZ; and
xxi. Other materials known to those familiar with the art.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the eventual appended claims and their equivalents.

What is claimed is:

1. A dry adhesive fiber structure with optimized geometric parameters for increasing adhesive performance, comprising:
   a dry adhesive fiber comprising a moldable plastic, the dry adhesive fiber including:
   a mushroom-shaped tip having a flat surface with a radius $a_t$, inwardly inclined sides that form a wedge angle γ with the surface, a tip edge formed by the flat surface and the inclined sides, wherein the tip edge is rounded, and an end opposite the surface; and
   a stem with a cross-sectional area having (i) a distal end connected to the end of the tip at a tip point of connection, (ii) a proximal end opposite the distal end, and (iii) a longitudinal length with a radius a from the distal end to the proximal end;
   wherein the ratio of $a_t/a$ is 1.05-1.4, the wedge angle γ is 20-55, and the normalized pull-off stress at the fiber surface is 0.7-0.9.

2. The dry adhesive fiber structure according to claim 1, wherein ratio of $a_t/a$ is 1.1-1.2, the wedge angle γ is 40-50, and the normalized pull-off stress at the fiber surface is 0.8-0.9.

3. The dry adhesive fiber structure according to claim 1, wherein ratio of $a_t/a$ is 1.1-1.2, the wedge angle γ is 45, and the normalized pull-off stress at the fiber surface at 0.9.

4. The dry adhesive fiber according to claim 1, wherein the tip edge has a radius of curvature of less than 10 nm.

5. The dry adhesive fiber according to claim 1, wherein the fiber length varies from 0.5 nm to 500 μm.

6. The dry adhesive fiber according to claim 1, wherein the shape of the inclined sides on the underside of the mushroom tip is selected from the group consisting of linear, convex, and concave shapes with respect to the stem axial direction and tip surface.

* * * * *